United States Patent [19]

Vireä

[11] Patent Number: 4,518,500

[45] Date of Patent: May 21, 1985

[54] APPARATUS FOR TREATING A FIBROUS MATERIAL

[75] Inventor: Seppo Vireä, Karhula, Finland

[73] Assignee: A. Ahlstrom Osakeyhtio, Noormarkku, Finland

[21] Appl. No.: 573,858

[22] Filed: Jan. 25, 1984

[30] Foreign Application Priority Data

Feb. 1, 1983 [FI] Finland ........ 830340

[51] Int. Cl.[3] ........ B01D 33/06

[52] U.S. Cl. ........ 210/380.3; 68/143

[58] Field of Search ........ 68/143, 144, 145, 27, 68/58; 366/227, 228, 237, 24, 25; 210/371, 377, 380.2, 380.3; 134/65, 69

[56] References Cited

U.S. PATENT DOCUMENTS

| | | | |
|---|---|---|---|
| 871,517 | 11/1907 | McDaniel | 134/65 X |
| 1,603,944 | 10/1926 | Fox | 134/69 |
| 1,839,214 | 1/1932 | Geddes | 134/65 X |
| 2,288,742 | 7/1942 | Ransohoff | 134/65 |
| 3,330,139 | 7/1967 | Schafer | 68/144 X |
| 3,893,311 | 7/1975 | Meyer | 68/143 |

FOREIGN PATENT DOCUMENTS

| | | | |
|---|---|---|---|
| 1460822 | 3/1969 | Fed. Rep. of Germany | 68/145 |

*Primary Examiner*—Philip R. Coe
*Assistant Examiner*—Frankie L. Stinson
*Attorney, Agent, or Firm*—Bucknam and Archer

[57] ABSTRACT

An apparatus for treating a fibrous material, e.g. for fiberizing and screening of waste paper, comprises a rotating drum which is provided with at least one partially perforated mantle and is divided into consecutive treating zones by means of a partition wall or walls. In connection with the partition wall there is provided a lifting structure which has an adjustable lifting capacity for transporting the material to be treated to the next treating zone through an opening in the partition wall.

8 Claims, 14 Drawing Figures

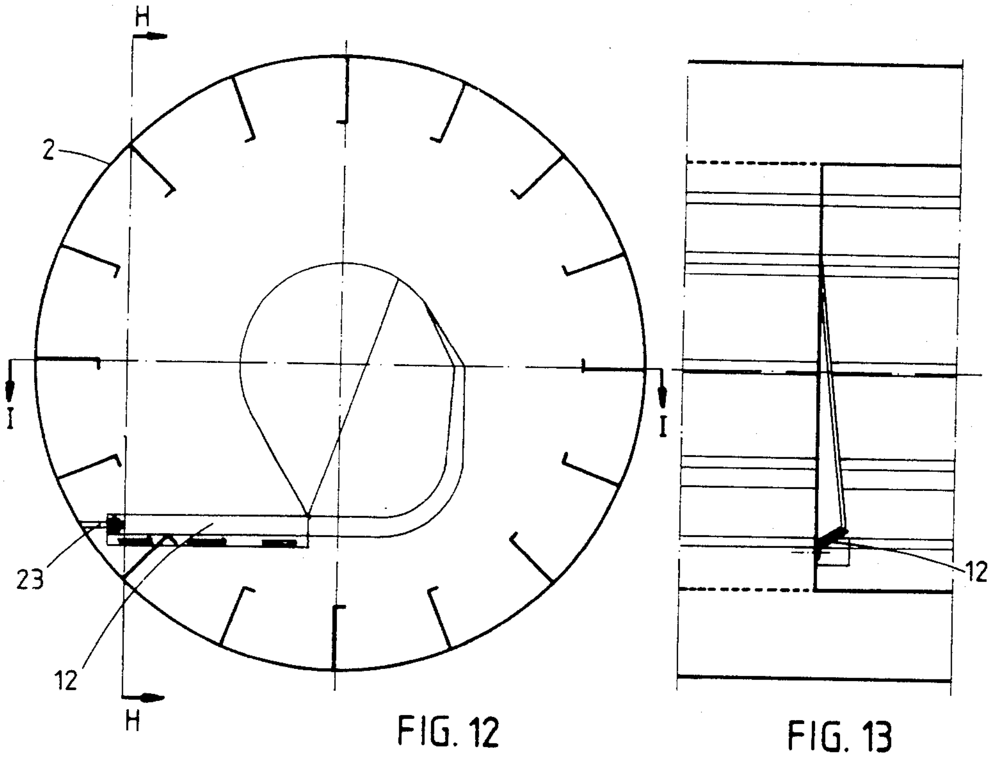
FIG. 12
FIG. 13
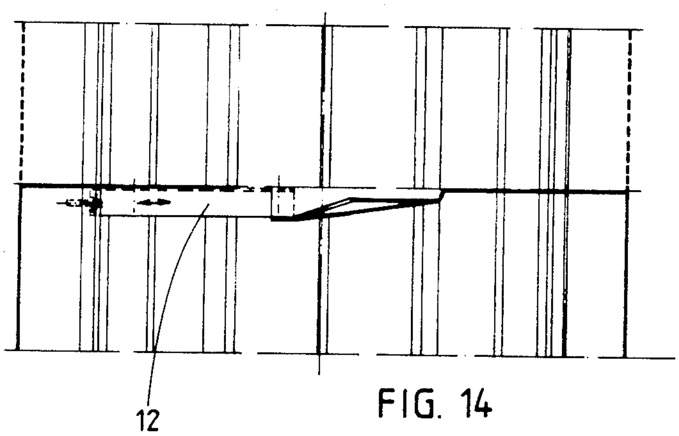
FIG. 14

APPARATUS FOR TREATING A FIBROUS MATERIAL

FIELD OF INVENTION

The present invention relates to an apparatus for treating a fibrous material, comprising a rotating drum which is provided with an at least partially perforated mantle and divided into consequtive treating zones by means of a partition wall or walls, and in one end of which there is disposed an inlet opening for the material to be treated and in the other end an outlet opening for the coarse fraction.

BACKGROUND OF THE INVENTION

Apparatuses of this kind are used e.g. for fiberizing or screening of waste paper, whereby the drum mantle is usually divided into two parts separated by a partition wall. The part in the inlet end is non-perforated and the one in the outlet end perforated. In the first, non-perforated part of the drum the material to be treated is wetted, treated with chemicals and fiberized and in the other, perforated part it is screened. Drums of this kind are disclosed e.g. in the German published patent application 2651198 and the U.S. patent application Ser. No. 367,179. The partition wall which forms an overflow sill determines the residence time of the material in the fiberizing zone. It is known to provide the drum with a fixed lifting member (a bucket) which lifts the treated material over the partition wall to the next treating zone.

SUMMARY OF THE INVENTION

It is an object of the invention to provide an apparatus in which the residence time of the material in a certain treating zone, e.g. in the first, non-perforated part of the drum, can be regulated. This is accomplished by providing a lifting member with an adjustable lifting capacity in connection with the partition wall for transporting the material to be treated to the next treating zone.

BRIEF DESCRIPTION OF THE DRAWINGS

The invention is described in more detail in the following with reference to the accompanying drawings. In the drawings:

FIG. 12 shows a fourth embodiment of the invention corresponding to the representation of FIG. 2, FIG. 13 is a section as on the line H—H of FIG. 12, and FIG. 14 is a section as on the line I—I of FIG. 12.

DESCRIPTION OF THE PREFERRED EMBODIMENTS

Figure 1:
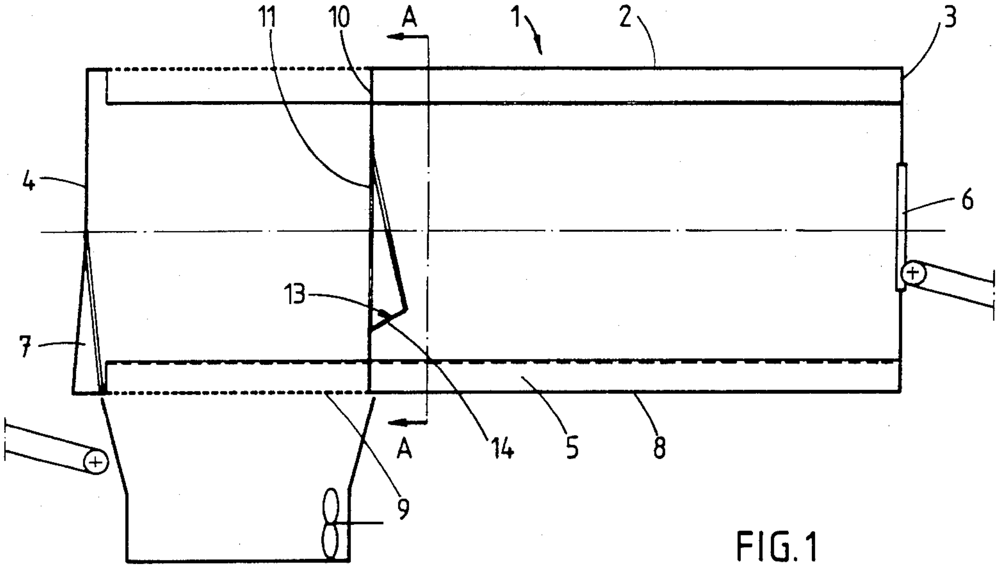
FIG. 1 shows a schematic cross-section of a known apparatus provided with a lifting member.
Figure 2:
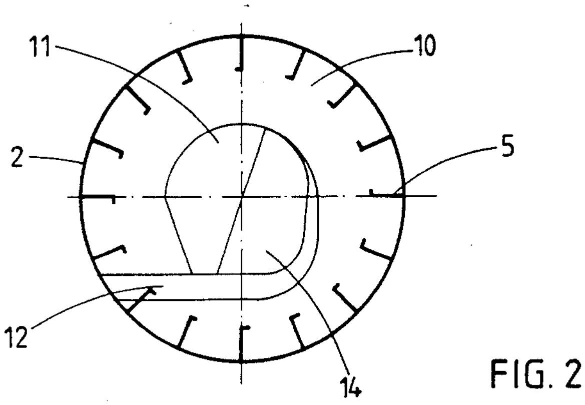
FIG. 2 is a section as on the line A—A of FIG. 1.

Referring now to the drawings, the reference numeral 1 in FIGS. 1 and 2 illustrating a known apparatus refers to a drum, 2 to its mantle and 3 and 4 to its ends. The drum is provided with longitudinal internal lifting ribs 5 which during the rotation of the drum continuously lift the material to be treated from the lowermost portion of the drum to a higher level, wherefrom it is thrown against the mantle of the drum and is thus subjected to impact effect and shearing forces which break down the fibre bonds. In one end 3 of the drum there is an inlet opening 6 through which the material to be treated is fed into the drum. In the opposite end 4 there is an outlet opening 7 for the separated coarse fraction. The inlet end 8 of the mantle is non-perforated and the outlet end 9 of the mantle is perforated. The non-perforated and perforated part of the drum are separated from each other by means of a partition wall 10 provided with an opening 11. The partition wall 10 is connected to a lifting member 12 which during rotation of the drum lifts the material on the bottom of the non-perforated part 8 to such a level that it flows down along a surface 13 of the lifting member to a trough 14 disposed in front of the opening 11 in the partition wall and further through the opening 11 to the treating zone formed by the perforated part of the mantle on the other side of the partition wall.

Figure 3:
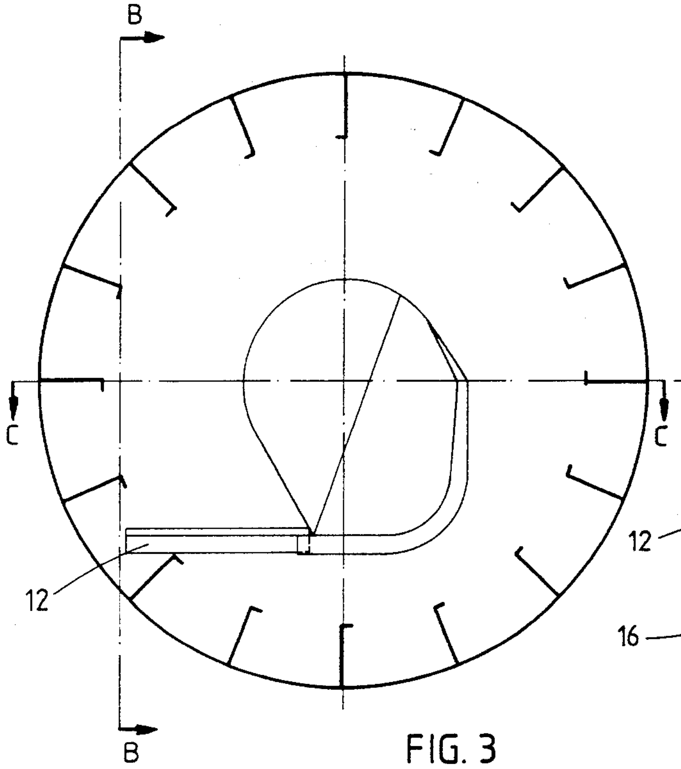
FIG. 3 shows an embodiment of the invention corresponding to the representation of FIG. 2 in a bigger scale.
Figure 4:
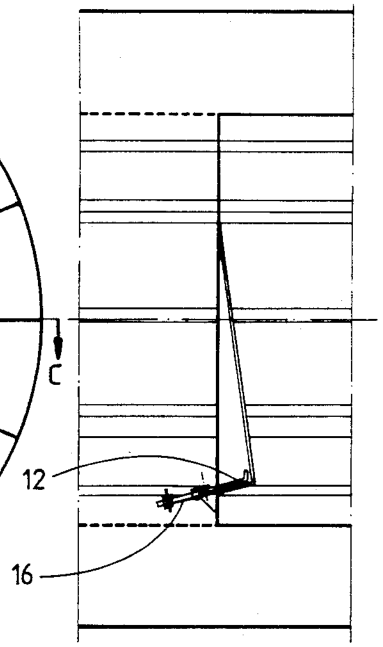
FIG. 4 is a section as on the line B—B of FIG. 3.
Figure 5:
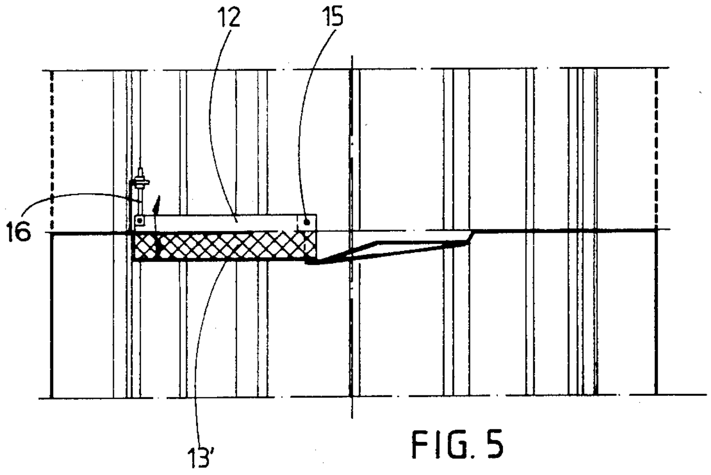
FIG. 5 is a section as on the line C—C of FIG. 3.

In the embodiment of the invention shown in FIGS. 3–5, the lifting member 12 can be pivoted round a pivot 15 disposed adjacent the trough and locked in a desired position by means of a set screw 16. The pivoting of the lifting member changes the size of its effective lifting surface 13', i.e. the part (hatched in FIG. 5) disposed upstreams with regard to the direction of the material flow, whereby also its lifting capacity changes.

Figure 6:
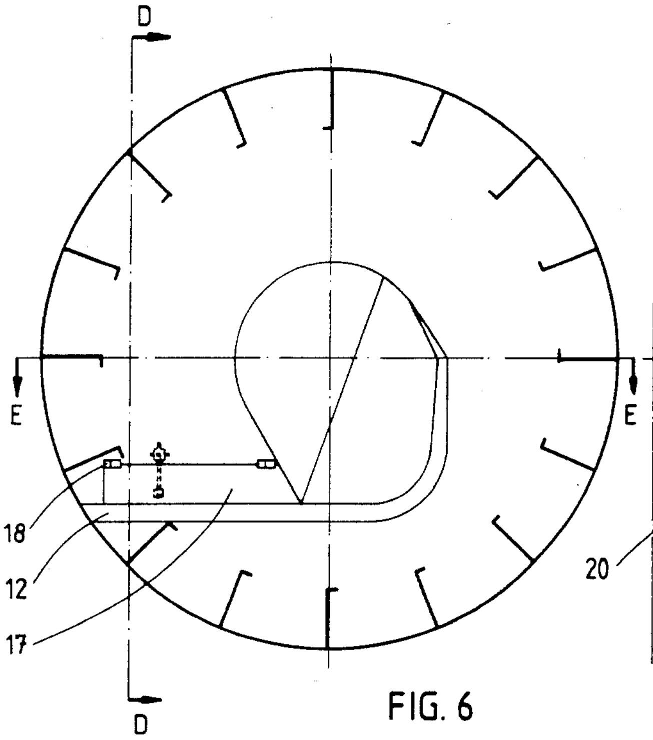
FIG. 6 shows another embodiment of the invention corresponding to the representation of FIG. 2.
Figure 7:
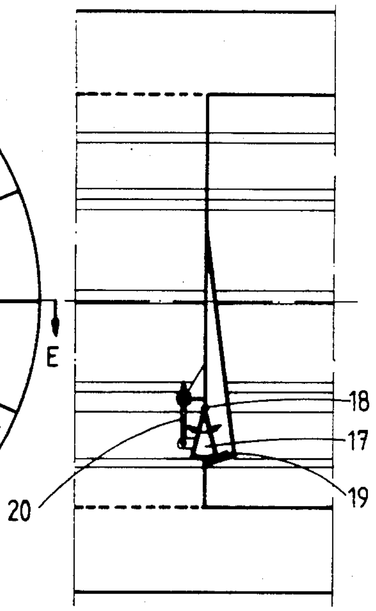
FIG. 7 is a section as on the line D—D of FIG. 6.
Figure 8:
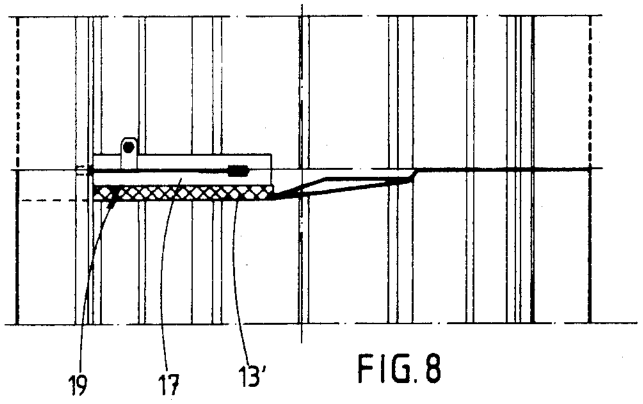
FIG. 8 is a section as on the line E—E of FIG. 6.

In the embodiment shown in FIGS. 6–8 the lifting member 12 is disposed stationarily in the drum. A guiding member 17 is connected to the drum for changing the size of the effective surface 13' (hatched in FIG. 8) of the lifting member. The guiding member 17 is pivotably disposed on a shaft 18 which is parallel with the surface 13 of the lifting member and perpendicular to the axis of the drum so that the position of its edge 19 adjacent the surface 13 changes when the guiding member is pivoted, whereby the effective surface of the lifting member becomes wider or narrower. The pivoting and locking of the guiding member in a desired position is carried out by means of a set screw 20.

Figure 9:
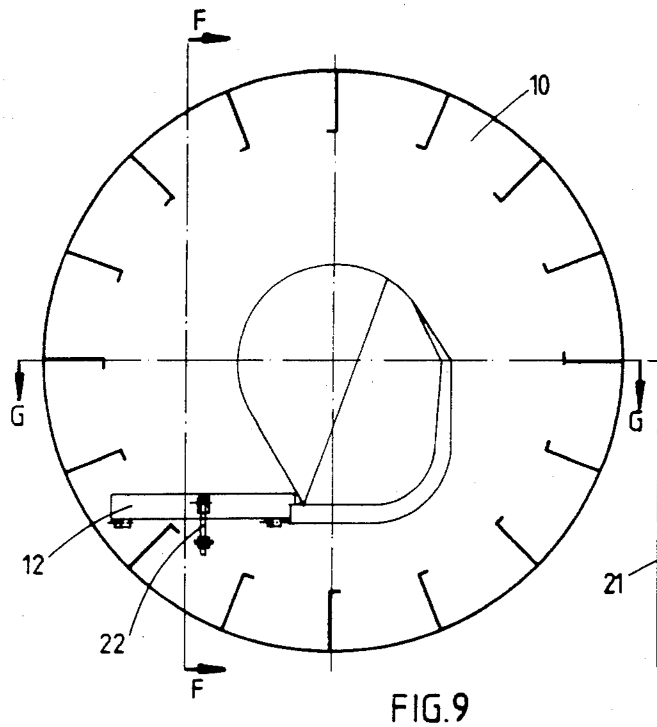
FIG. 9 shows a third embodiment of the invention corresponding to the representation of FIG. 2.
Figure 10:
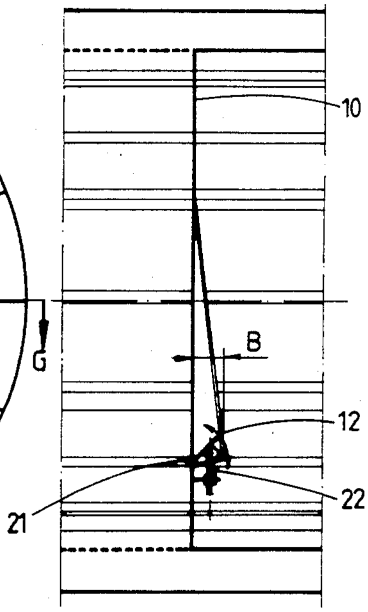
FIG. 10 is a section as on the line F—F of FIG. 9.
Figure 11:
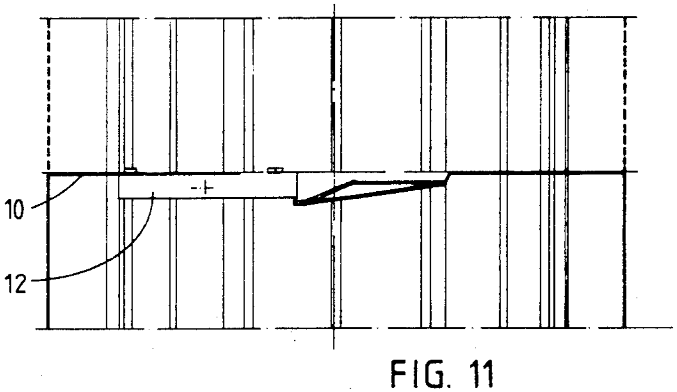
FIG. 11 is a section as on the line G—G of FIG. 9.

In the embodiment illustrated in FIGS. 9–11 the lifting member 12 is pivoted round a shaft 21 parallel to the partition wall so that the distance B of the lifting member from the partition wall and thereby also its lifting capacity change. The pivoting movement of the lifting member and its locking are carried out by means of a set screw 22.

In the embodiment illustrated in FIGS. 12–14 the lifting member can be moved translatorily in its longitudinal direction so that its distance from the mantle 2 of the drum is changed. The movement and the locking of the lifting member is carried out by means of a set screw 23.

The invention provides the following changes in the operation of the apparatus:

change in the flow caused by the lifting means change in the residence time of the fibrous material fed in.

While some specific embodiments of the invention have been described in detail above, it is to be understood that various modifications may be made from the specific details described without departing from the spirit and scope of the claims. Thus the adjustable lifting means may be provided in connection with a partition wall located in the unperforated part of the mantle.

What is claimed is:

1. An apparatus for continuously fiberizing and screening coarse fibrous material to separate the coarse material therefrom which comprises a rotatable drum having an inlet at one end thereof for the material to be treated, an outlet at the opposite end thereof for discharging the separated coarse material, a mantle for the drum which is non-perforated at the inlet end and is perforated at the outlet end, at least one partition wall having an opening, said drum having a longitudinal axis, the partition wall being perpendicular to said longitudinal axis, the partition wall forming a sill over which the material is lifted, a lifting member connected to said partition wall, said lifting member having a lifting capacity, said lifting member lifting the material on the bottom of said non-perforated end for transporting the material to the perforated outlet end, through said opening, said lifting member having means for adjusting the effective capacity of said lifting member and means for locking the lifting member in a desired position.

2. The apparatus according to claim 1 wherein said means for adjusting the effective lifting capacity of said lifting member comprise means for pivoting said lifting member and changing the effective surface thereof.

3. The apparatus according to claim 1 wherein said means for adjusting the effective lifting capacity of said lifting member comprise means for adjusting the distance between the lifting member and the mantle surface of the drum.

4. The apparatus according to claim 1 wherein said means for adjusting the effective lifting capacity of said lifting capacity of said lifting member comprise means for adjusting the distance between the lifting member and the partition wall.

5. The apparatus according to claim 1 wherein said means for adjusting the effective lifting capacity of said lifting member comprise means for adjusting the angle between the lifting member and the partition wall.

6. The apparatus according to claim 1 wherein said means for adjusting the effective lifting capacity of said lifting member comprise means for moving the lifting member translatorily.

7. The apparatus according to claim 1 wherein said means for adjusting the effective lifting capacity of said lifting member comprise means for covering part of the surface of the lifting member.

8. The apparatus according to claim 1 wherein said means for adjusting the effective lifting capacity of said lifting member comprise a guiding member pivotably disposed on a shaft which is parallel with the surface of the lifting member so that the position of its the edge adjacent to the surface of the lifting member changes with regard to the surface when the guiding member is pivoted.

* * * * *